(12) United States Patent
Glenn et al.

(10) Patent No.: US 11,192,543 B2
(45) Date of Patent: Dec. 7, 2021

(54) SYSTEMS AND METHODS FOR AUTOMATED STOPPING AND/OR PARKING OF AUTONOMOUS VEHICLES

(71) Applicant: Ford Global Technologies, LLC, Dearborn, MI (US)

(72) Inventors: Tyler Glenn, Ypsilanti, MI (US); Shadi Jammoul, Plymouth, MI (US); Levasseur Tellis, Southfield, MI (US); Gerald H. Engelman, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/230,630

(22) Filed: Dec. 21, 2018

(65) Prior Publication Data
US 2020/0198619 A1 Jun. 25, 2020

(51) Int. Cl.
| | |
|---|---|
| *B60W 30/06* | (2006.01) |
| *G01C 21/36* | (2006.01) |
| *G06K 9/00* | (2006.01) |
| *B60W 30/18* | (2012.01) |
| *B60W 50/10* | (2012.01) |
| *G05D 1/00* | (2006.01) |

(52) U.S. Cl.
CPC .......... *B60W 30/06* (2013.01); *B60W 30/181* (2013.01); *B60W 50/10* (2013.01); *G01C 21/3685* (2013.01); *G05D 1/0088* (2013.01); *G06K 9/00812* (2013.01); *G05D 2201/0213* (2013.01)

(58) Field of Classification Search
CPC .... B60W 30/06; B60W 30/181; B60W 50/10; G01C 21/3685; G05D 1/0088; G05D 2201/0213; G06K 9/00812
See application file for complete search history.

(56) References Cited

U.S. PATENT DOCUMENTS

| 9,547,307 | B1 * | 1/2017 | Cullinane | .......... G06Q 10/1095 |
| 9,953,283 | B2 | 4/2018 | Sweeney et al. | |
| 10,295,363 | B1 * | 5/2019 | Konrardy | .................. B60P 3/12 |
| 10,473,470 | B2 * | 11/2019 | Iagnemma | ............. G01C 21/30 |

(Continued)

OTHER PUBLICATIONS

General Motors (2018). 2018 Self-Driving Safety Report. pp. 1-33. Retrieved from https://www.gm.com/content/dam/company/docs/us/en/gmcom/gmsafetyreport.pdf.

*Primary Examiner* — Mahmoud S Ismail
*Assistant Examiner* — Gabriel Anfinrud
(74) *Attorney, Agent, or Firm* — Brandon Hicks; Eversheds Sutherland (US) LLP (57) ABSTRACT

Apparatuses and methods for automated parking of autonomous vehicles are provided herein. An example method includes receiving, by an automated driving system of an autonomous vehicle, a pull over request during a trip to a destination; initiating, by the automated driving system, a pull over sequence, the pull over sequence including determining if the autonomous vehicle is within a pre-determined distance from the destination; stopping the autonomous vehicle when the autonomous vehicle is within the pre-determined distance; and when the autonomous vehicle is not within the pre-determined distance, initiating a parking sequence to park the autonomous vehicle at a nearest available parking location.

20 Claims, 6 Drawing Sheets

(56) References Cited

U.S. PATENT DOCUMENTS

| | | | |
|---|---|---|---|
| 2005/0270177 A1* | 12/2005 | Mori | G08G 1/166 340/932.2 |
| 2015/0338849 A1* | 11/2015 | Nemec | B60W 50/082 701/25 |
| 2017/0308082 A1* | 10/2017 | Ullrich | G05D 1/0061 |
| 2018/0147988 A1 | 5/2018 | Lee et al. | |
| 2018/0326997 A1* | 11/2018 | Sweeney | G01C 21/3617 |
| 2019/0064808 A1* | 2/2019 | Dyer | B60W 30/00 |
| 2019/0155283 A1* | 5/2019 | Herbach | G06Q 10/02 |
| 2019/0235499 A1* | 8/2019 | Kazemi | B60W 30/0956 |

* cited by examiner

SYSTEMS AND METHODS FOR AUTOMATED STOPPING AND/OR PARKING OF AUTONOMOUS VEHICLES

TECHNICAL FIELD

The present disclosure relates to systems and methods that provide automated and passenger-directed stopping and/or parking of autonomous vehicles.

BACKGROUND

In some autonomous vehicles (AVs), an automated system is responsible for operating the AV including driving tasks. Thus, there is no need for a human driver. As such, many of these vehicles are being designed with driving controls (steering wheel, pedals, and so forth) that can be locked out or without standard driving controls altogether. While traveling in such an AV, it will be understood that a passenger may have a need to direct the AV to come to a stop during a ride. This could be for comfort reasons (e.g., the passenger is feeling nauseated) or for something more urgent (e.g., the passenger is having a health emergency). Additionally, a user may attempt to suddenly leave the vehicle at any time by opening the door. Each of these example scenarios cannot be ameliorated using current automated AV systems.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure is related to systems and methods for passenger-initiated AV parking or pull over processes. For example, a passenger may desire to interrupt a trip while the AV is in motion. The AV is configured to safely and efficiently move into a stopped or parked configuration in response.

In some embodiments, the passenger-initiated AV parking can be facilitated using a human machine interface (HMI) that is accessible to a passenger in an AV. For purposes of clarity, the word passenger can be used interchangeably with rider or customer. Using the systems and methods disclosed herein, passenger(s) can initiate pull over requests during a trip, initiate and conduct customer service calls (which can also occur in an automated manner in some instances), and resume and/or terminate trips—just to name a few.

In some embodiments, an AV of the present disclosure can be specifically configured with various components and/or capabilities related to parking or pull over processes. For example, the AV may comprise a pull-over request sequence to indicate a passenger's desire for the vehicle to pull over. The AV may further comprise a customer service call sequence to initiate a two-way audio (and possibly video) call with a customer service representative. In some instances, the AV may further comprise a trip resume sequence to indicate a passenger's desire to resume the trip at some point after the pull over is completed. In some embodiments, these processes are facilitated through an HMI that can include, for example, any combination of physical actuators such as button or a switch, one or more user interface (UI) actuators such as a button or a slider, and/or a voice control system implemented in the AV. In some embodiments, the HMI can be implemented on a mobile device of a passenger rather than in (or in addition to) the AV. For example, a smartphone can implement an application that allows a user to request a trip-interrupting stop, and this request is transmitted to the AV from the smartphone.

Some embodiments allow for passenger-initiated AV parking or stopping through other means such as sensing AV door openings when the AV is in motion. These and other aspects and advantages of the present disclosure are described in greater detail herein with reference to the collective drawings.

Illustrative Architecture

Figure 1:
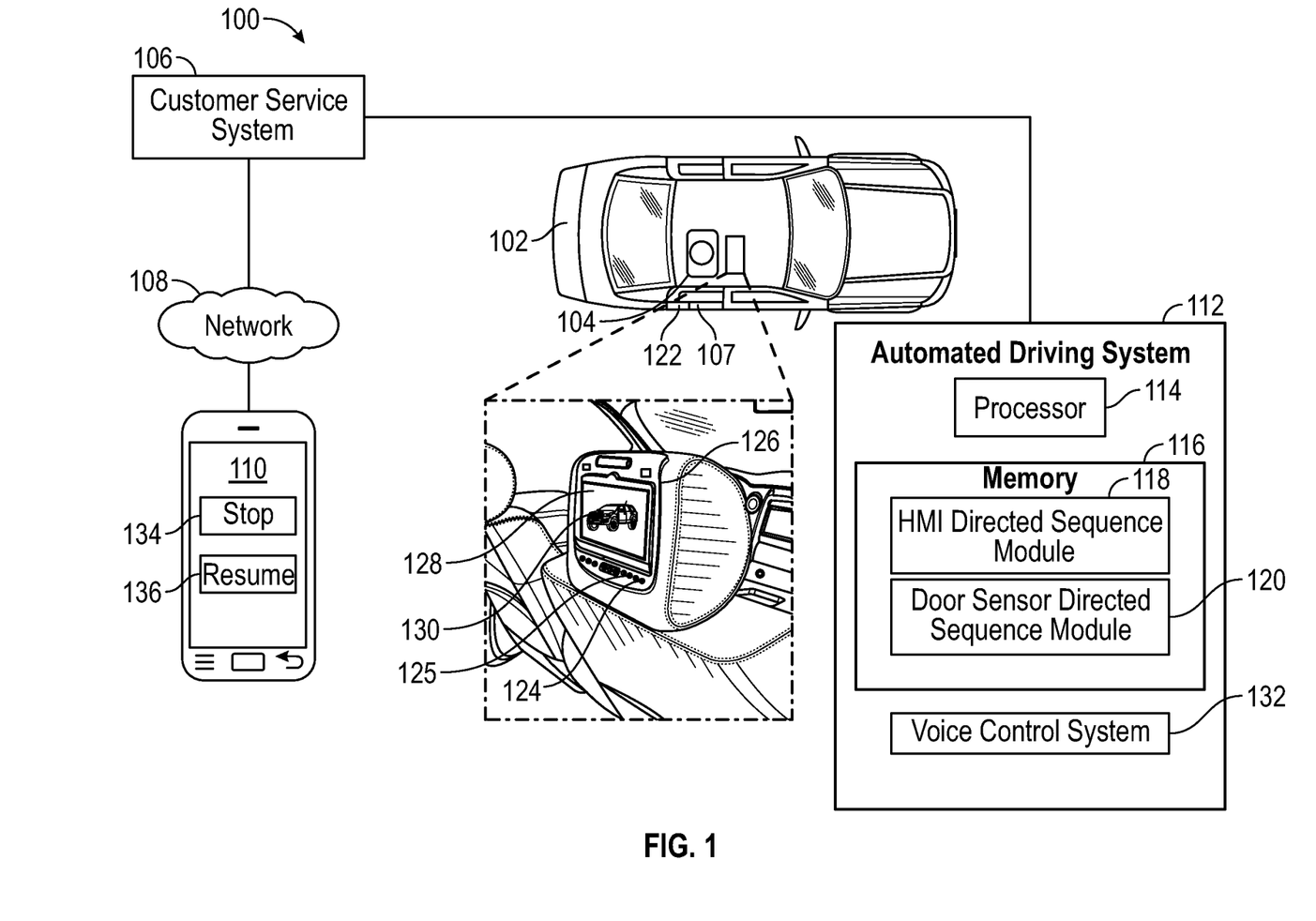
FIG. 1 depicts an illustrative architecture in which techniques and structures for providing the systems and methods disclosed herein may be implemented.

Turning now to the drawings, FIG. 1 depicts an illustrative architecture 100 in which techniques and structures for providing the systems and methods disclosed herein may be implemented. The illustrative architecture 100 may include an automated vehicle (AV) 102 and a passenger 104 within the AV 102. In general, the AV 102 provides automated transportation of the passenger 104 to a destination, and this transportation process is referred to as a trip. Broadly, the present disclosure provides for systems and methods that allow the passenger 104 to interrupt the trip by requesting that the AV 102 stop, pull over, and/or eventually resume the trip.

The architecture 100 can also comprise a customer service system 106 and a network 108. The network 108 allows for components within the architecture 100 to communicate with one another. The network 108 may include any one or a combination of multiple different types of networks, such as cable networks, the Internet, wireless networks, and other private and/or public networks. In some instances, the network 108 may include cellular, Wi-Fi, or Wi-Fi direct. The AV 102 can bi-directionally communicate with the customer service system 106 and/or a mobile device 110 using the network 108. Additional details regarding communications between these systems and devices are provided in greater detail herein. Rather than (or in addition to) using the network 108, the mobile device 110 can communicate with the AV 102 using device-to-device communication over a short range wireless connection such as Bluetooth or near-field communication (NFC).

In general, the AV 102 comprises an automated driving system 112 (abbreviated as ADS on some illustrations) that is configured to provide dynamic driving tasks such as controlling vehicle operations including, but not limited to, acceleration, braking, steering, navigation, and managing various sequences of the present disclosure such as pull over sequences, stopping sequences, and/or additional sequences related to resuming travel after a pull over or stop sequence. A schematic view of the automated driving system 112 is provided which includes a processor 114 and memory 116. In general, the automated driving system 112 is a specifically configured computing device that is configured to allow the AV 102 to perform any one or more of the passenger-initiated processes disclosed herein. In some embodiments, the memory 116 is configured with sequence modules such as an HMI directed sequence module 118. In another embodiment, the memory 116 is configured with a door sensor directed sequence module 120. Each of these sequences and modules is described in greater detail infra.

In some embodiments, the AV 102 can include one or more door switches or sensors such as door switch 122. In these embodiments, the processor 114 can utilize the door sensor directed sequence module 120 to detect when one or more of the doors of the AV 102 have been opened when the AV 102 is in motion. The door sensor directed sequence module 120 can be used to stop, pull over, or otherwise control operations of the AV 102 in response to the processor 114 detecting when one or more of the doors of the AV 102 have been opened. For example, the processor 114 can detect when a door switch 122 is tripped. In one example, the door switch 122 can include a contact integrated into a door 107 and another contact integrated into a frame of the AV 102 that the door 107 mates with when closed. When the door 107 is opened, the door switch 122 is triggered as the contacts move away from one another. These are merely example descriptions of a process for determining a door opening, and other devices and methods are likewise contemplated for use.

Rather than relying on a door opening event, the HMI directed sequence module 118 can be executed by the processor 114 when the passenger 104 has indicated that he/she wishes to stop or pull over the AV 102 using an HMI.

To be sure, the HMI can refer to a device integrated into the AV 102 that allows the passenger 104 to indicate that he/she wishes to interrupt a trip. The HMI can include a physical object such as a button, a slider, a switch, or another actuator that is available to the passenger 104. For example, the HMI can include a physical button 124 included in an infotainment system 126 of the AV 102. This physical button 124 can be assigned to a function such as a pull over request. The HMI can include another physical button 125 included in an infotainment system 126 of the AV 102. This physical button 125 can be assigned to a function such as an emergency stop request. Each of these requests can trigger different responses by the automated driving system 112.

In another example, the HMI could be integrated into a door panel of the AV 102. In yet other embodiments, the HMI could include an element 128 of a graphical user interface (GUI) 130 displayed on the infotainment system 126. In another embodiment, the HMI can include a voice control system 132 of the AV 102. The voice control system 132 can be configured to listen for keywords or phrases associated with a desire of the passenger 104 to interrupt a trip. Example keywords or phrases include "stop" or "stop the car." The voice control system 132 can utilize natural language processing, for example, to interpret and process keywords or phrases that are associated with an indication that the passenger 104 desires to interrupt a trip.

In other embodiments, the HMI could include GUIs and GUI components delivered to a passenger 104 through the passenger's mobile device 110. For example, a GUI can comprise a stop button 134 that indicates to the automated driving system 112 that the AV 102 should be stopped or pulled over. The GUI can also have a resume button 136 that allows the passenger 104 to indicate to the automated driving system 112 that the AV 102 should continue the trip.

In one embodiment, the HMI is a touchscreen that can display a first graphical user interface that allows a passenger to choose the pull over request. The HMI can also display a second graphical user interface that allows a passenger to establish a communication channel with a customer service agent. An HMI can also display a third graphical user interface that allows a passenger to resume or discontinue the trip after the autonomous vehicle has reached the controlled stop or has stopped at the nearest available parking location.

Illustrative Methods and Operations

Figure 2:
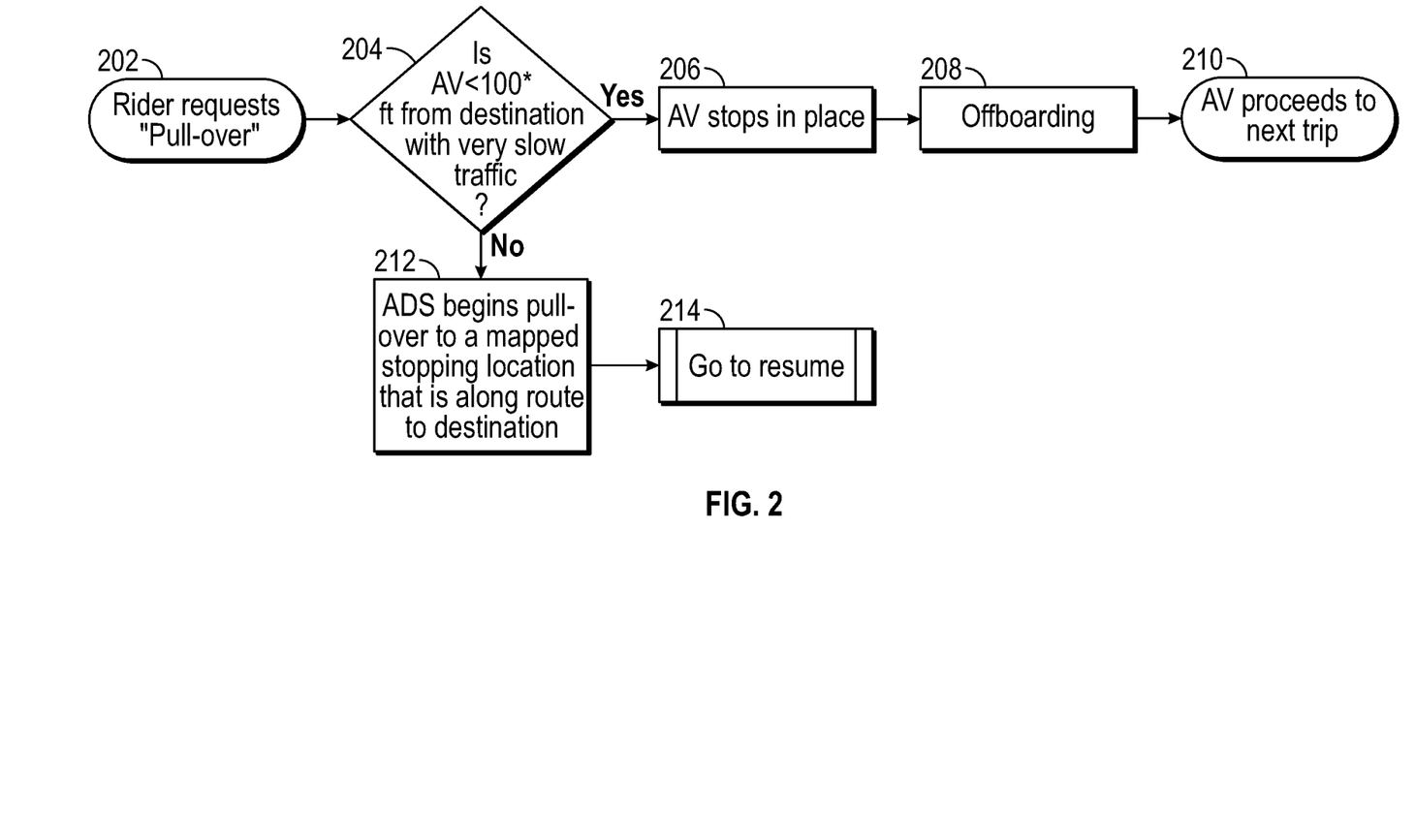
FIG. 2 is a flowchart of an example method related to performing a passenger-initiated pull over request in an automated vehicle.

Referring now to FIGS. 1 and 2 collectively, a flowchart of an example method of the present disclosure is illustrated and described. In step 202, a rider or passenger has requested that the AV perform a pull over sequence. This is generally referred to as the AV receiving a pull over request. In an example use case, the passenger may be ill and wants to have the AV pull over so that the passenger can step outside. This request can be received through any HMI disclosed herein, and the automated driving system 112 can utilize the HMI directed sequence module 118 to process the request. For example, the passenger could depress the physical button 124 on the infotainment system 126 or a stop button integrated into a door of the AV 102. In some embodiments, the method includes a step 204 that comprises a decision on whether the AV 102 is within a pre-determined distance from a destination and/or if the AV 102 is operating in a slow traffic area. In one example, the pre-determined distance could be 100 meters from a selected destination. To be sure, other pre-determined distances can be selected. Distances from destinations can be calculated using GPS coordinates and a map utilized by the automated driving system 112 of the AV 102.

The determination of whether the AV 102 is operating in a slow traffic area is predicated upon safety. To be sure, it is not desirable to allow an AV 102 to stop or pull over rapidly if the AV 102 is operating in an area where vehicles are moving rapidly around the AV 102. In some embodiments, the traffic speed can be determined based on a current speed of the AV 102 or based on traffic-related information available to the automated driving system 112. In various embodiments, the automated driving system 112 can maintain a speed threshold. For example, the speed threshold could include five miles per hour. Thus, if the AV 102 is traveling at under five miles per hour, or other traffic in the area is traveling under five miles per hour, the automated driving system 112 can allow the AV 102 to stop in place. In some embodiments, the method does not require a consideration of traffic speed but only a determination of whether the AV 102 is within the pre-determined distance from the destination.

In instances where the AV 102 is within the pre-determined distance from the destination and/or traffic speed is within the speed threshold, the method can include a step 206 of performing a stop sequence (such as where the AV stops in place). In some embodiments, the stop sequence is performed by the automated driving system 112 which is configured to stop the AV 102 when the autonomous vehicle is within the pre-determined distance. Stopping the AV 102 can include controlling the braking system of the AV 102 to stop the AV 102. This process is referred to as stopping the AV 102 in place, although this is understood to optionally include aspects of slowing the AV 102 to prevent abrupt AV 102 movement that might be felt by the passenger 104.

In some embodiments, after the stop sequence has been initiated in step 206, the method can include a step 208 of performing an off-boarding sequence. The off-boarding sequence can include allowing for an off-boarding time period, such as a few minutes, where the passenger 104 can gather belongings and safely exit the AV 102. This can also include subsequent processes such as passenger billing and so forth. In some embodiments, the AV 102 can then proceed to another trip with another passenger in step 210.

If the automated driving system 112 determines that the AV 102 is not within the pre-determined distance to the destination and/or that traffic speed is not within the speed threshold, the method includes a step 212 where the automated driving system 112 can execute a parking sequence to park the autonomous vehicle at a nearest available parking location relative to a current location of the AV 102. Stated otherwise, the automated driving system 112 begins to pull over to a mapped stopping location that is designated along a route to the destination. The mapped stopping location could include a parking lot, a parking space, and so forth. After the parking sequence is complete, the method can proceed to a trip resume sequence in step 214. A trip resume sequence can occur when a passenger indicates that he/she has returned to the AV and wishes to complete the trip. Example details regarding trip resume sequences are provided in FIG. 5 and described in greater detail herein.

Figure 3:
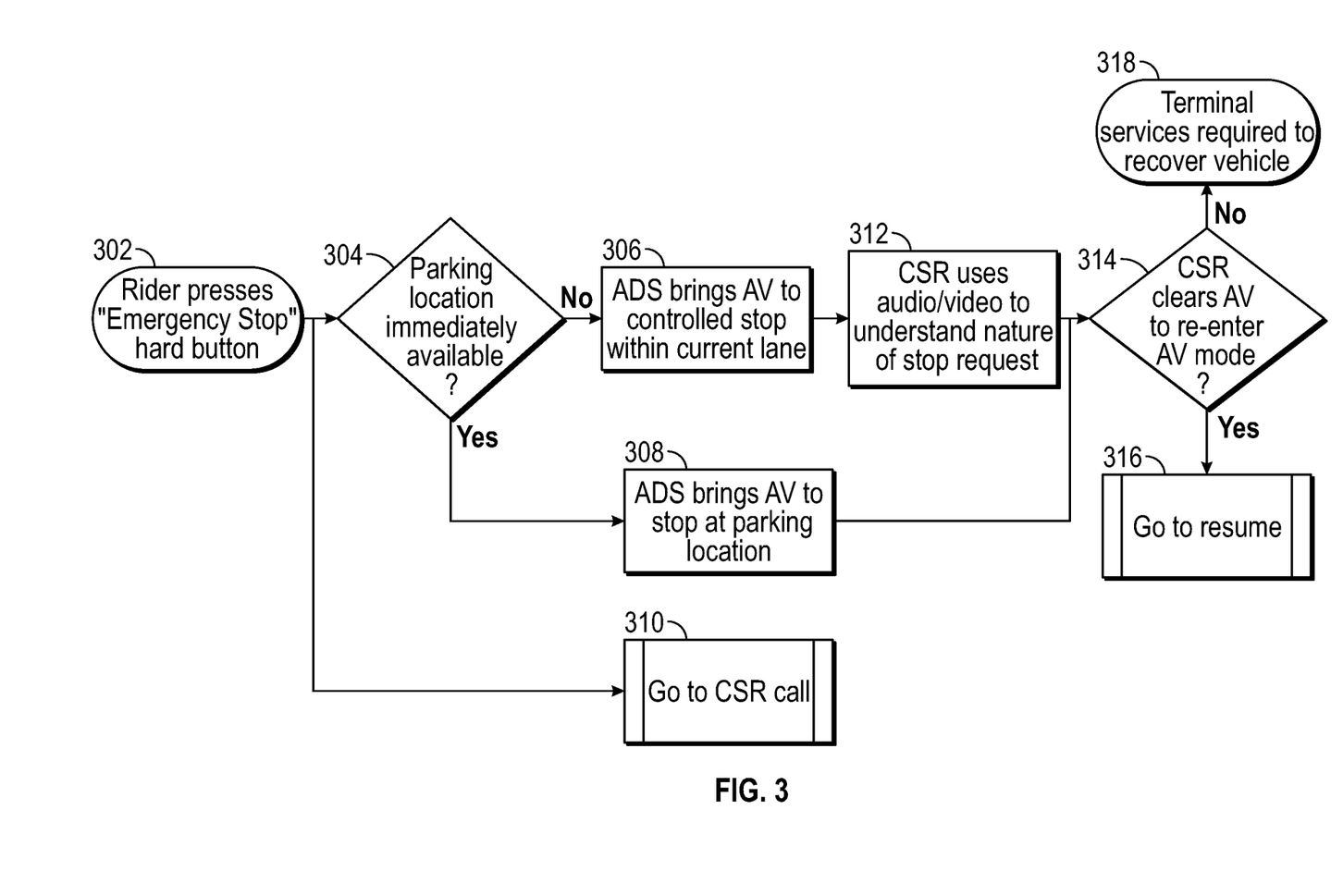
FIG. 3 is a flowchart of an example method related to performing an emergency-based passenger-initiated pull over request in an automated vehicle.

Referring now to FIGS. 1 and 3 collectively, another example method is illustrated. The method includes a step 302 of a rider or passenger requesting that the AV perform a pull over sequence in response to an emergency event. In an example use case, the passenger may be ill and wants to have the AV pull over so that the passenger can step outside. This request can be received through any HMI disclosed herein, and the automated driving system 112 can utilize the HMI directed sequence module 118 to process the request. For example, the passenger could depress an emergency stop button (physical button 125 on an infotainment system 126) or a stop button integrated into a door of the AV 102.

Once an emergency stop request is received, the method includes a step 304 of determining if there is a parking location available. This can include the automated driving system 112 determining if any parking spaces, parking lots, or other designated pull over or parking areas are near the AV 102. If no parking location is available, the method includes a step 306 where automated driving system 112 brings the AV 102 to a stop in a current lane where the AV 102 is driving. Alternatively, if a parking location is available, the AV 102 can bring the AV 102 to a stop at the available parking location selected as indicated in step 308. In some embodiments, in addition to parking the AV 102, the automated driving system 112 can be configured to perform a customer service call sequence in step 310.

In one embodiment, this can include establishing a communication channel with the customer service system 106. This communication channel can be established over the network 108. In some instances, the passenger 104 can communicate with the customer service system 106 through a microphone of the voice control system 132 in the AV 102. A customer service agent can assess the nature and extent of the emergency event. This step can also be performed as step 312 that follows step 306. Additional details regarding the customer service call sequence are illustrated and described with respect to FIG. 6.

In some instances, the customer service agent can clear the AV 102 to continue the trip if the passenger 104 indicates that he/she wishes to continue the trip in step 314, and any potential emergencies have been resolved. In one example embodiment, the method can proceed to a trip resume sequence in step 316. A trip resume sequence can occur when a passenger indicates that he/she has returned to the AV and wishes to complete the trip. Example details regarding trip resume sequences are provided in FIG. 5 and described in greater detail herein.

In the event that the emergency event relates to a defect or mechanical issue with the AV 102, the customer service system 106 can dispatch terminal services to recover the AV 102 in step 318.

Figure 4:
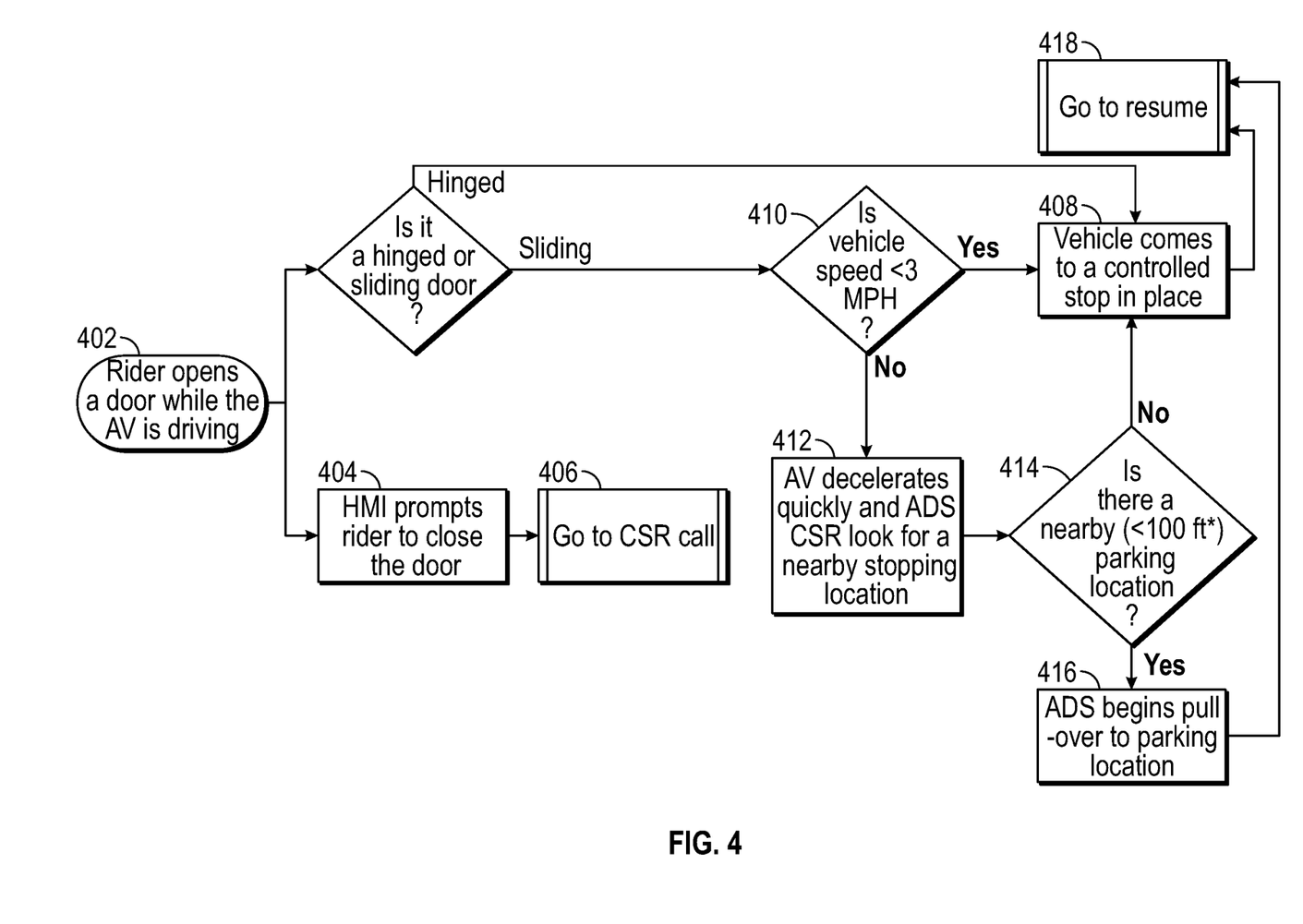
FIG. 4 is a flowchart of an example method related to performing a door opening-based pull over request in an automated vehicle.

Referring now to FIGS. 1 and 4, an example method is illustrated for controlling an AV 102 when the passenger 104 has opened a door of the AV 102 when the AV 102 is in motion during a trip. In general, the method includes a step 402 of determining the opening of a door of an AV 102 while the AV 102 is in motion during a trip based on signals generated by a door switch of the AV 102. In these instances, the processor 114 of the automated driving system 112 utilizes the door sensor directed sequence module 120 to control the AV 102. In general, the automated driving system 112 can prompt the passenger to close the door 107 in step 404. This step 404 can occur in combination with other steps disclosed herein. The passenger can be prompted to close the door 107 using a message displayed on the infotainment system 126, for example. Also, a customer service call sequence can be initiated in step 406. Again, an example customer service call sequence is illustrated and described with respect to FIG. 6.

Some AVs have doors that are actuated to open and close using a hinge and, in other AVs, the doors are actuated to open and close using a slider, such as a van. If the AV 102 includes a hinged door, the method includes a step 408 of bringing the AV 102 to a controlled stop in place without regard to the speed of the AV 102. As noted above, this can include the automated driving system 112 slowing the AV 102 to a stop through the braking system of the AV 102. In embodiments where the AV 102 includes a sliding door, the method includes a step 410 of the automated driving system 112 determining if a speed of the AV 102 is at or below a speed threshold. In one example embodiment, the speed threshold is three miles per hour, although this is merely an example speed threshold and other speeds may be used. If the AV 102 is above the speed threshold, the method includes a step 412 of quickly decelerating the AV 102 when the speed of the AV 102 is above the speed threshold and navigating the autonomous vehicle to a nearest available parking location. Alternatively, if the AV 102 is below the speed threshold, the method proceeds to step 408 which brings the AV 102 to a controlled stop in place.

In some instances, the method can include determining if an available parking location is within a pre-determined distance in step 414 after the quick decelerating in step 412. If no available parking location is within a pre-determined distance, the method can proceed to step 408 which brings the AV 102 to a controlled stop in place. If an available parking location is near, the method can include a step 416 of initiating a parking sequence to park the AV 102 at this available parking location. As with other methods, once the AV 102 has stopped or has been parked, the method can include allowing the passenger to complete the trip using a trip resume sequence in step 418. Example details regarding trip resume sequences are provided in FIG. 5 and described in greater detail herein.

As noted above, FIG. 5 illustrates an example method related to a trip resume sequence. The following descriptions reference FIGS. 1 and 5 collectively. The trip resume sequence can be initiated when an AV 102 has stopped or has been parked according to any of the embodiments disclosed herein. In one embodiment, a method includes a step 502 of presenting a message on the HMI of the autonomous vehicle that queries a passenger to resume the trip. The message could be audible and played through the voice control system 132 or could be displayed on the infotainment system 126 as an example. The method includes a step 504 of determining if the passenger has selected or chosen to resume the trip.

Figure 5:
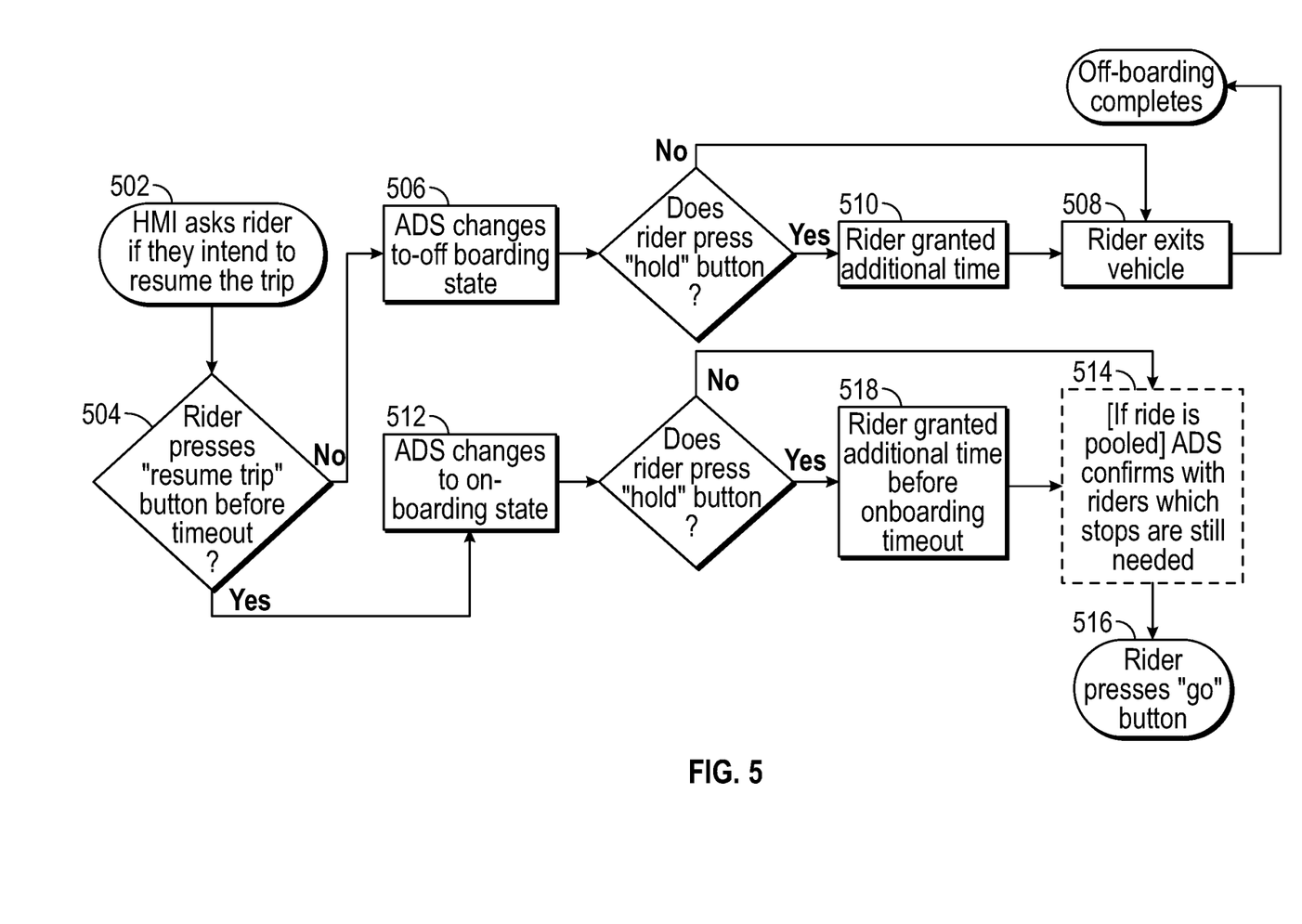
FIG. 5 is a flowchart of an example method related to performing a trip resuming function with both on-boarding and off-boarding sequences.

For example, the passenger could use the resume button 136 on the passenger's mobile device 110 (this could be presented on the infotainment system 126) or provided as a voice command through the voice control system 132. If the passenger indicates that he/she does not want to resume the trip, the method includes a step 506 of initiating an off-boarding sequence which can include the automated driving system 112 switching to an off-boarding state. The off-boarding state generally indicates that the passenger does not want to continue the trip. In general, when the passenger provides a response that indicates that the passenger does not want to continue the trip an off-boarding sequence is initiated.

In some instances, the passenger provides a ride termination or response through the HMI when the AV 102 is parked. The automated driving system 112 can immediately initiate the off-boarding sequence upon receiving the ride termination request, and the rider can exit the AV 102 in step 508.

On the other hand, even if the automated driving system 112 has initiated the off-boarding sequence, the automated driving system 112 can still offer the passenger an ability to continue the trip by presenting the passenger with a hold button on the HMI. Again, this hold button could be a physical button on the infotainment system 126 or a virtual button on a GUI of the infotainment system 126, as examples. If the passenger does not select the hold button, this is effectively considered by the automated driving system 112 to be a trip termination request. Alternatively, if the passenger uses the hold button, the method can include a step 510 of providing the passenger with additional time. This allows the AV 102 to remain parked for a period of time, such as five minutes, and allows the passenger to determine if he/she desires to continue the trip. If the passenger ultimately decides to terminate the trip, the method proceeds to step 508.

On the other hand, if the response message indicates that the passenger does want to continue the trip an on-boarding sequence can be initiated in step 512. The on-boarding sequence can include providing the passenger with a time frame to get situated within the AV such as storing items like luggage and securing a seat belt. The automated driving system 112 can also offer the passenger the ability to hold the trip with a hold button on the HMI as noted above. Again, this hold button could be a physical button on the infotainment system 126 or a virtual button on a GUI of the infotainment system 126, as examples. If the passenger does not select the hold button, the method proceeds to step 514 where the automated driving system 112 confirms with a passenger or other passengers in the AV 102 (when multiple passengers are present) if all destinations are still needed. The passengers can confirm or decline one or more of the destinations through the HMI and choose to continue the trip through the HMI in step 516. Step 516 can include a passenger(s) pressing a "go" button on the HMI. To be sure, step 514 can be limited to circumstances where multiple passengers are present.

If the passenger uses the hold button, the method can include a step 518 of providing the passenger with additional time. This allows the AV 102 to remain parked for a period of time, such as five minutes, and allows the passenger to determine if he/she desires to continue the trip. If the passenger ultimately decides to continue the trip, the method proceeds to step 514 (if multiple passengers are present) or alternatively to step 516 and the trip is resumed. In general, the hold request can function to delay the off-boarding sequence or the on-boarding sequence for a period of time based on the hold request.

Figure 6:
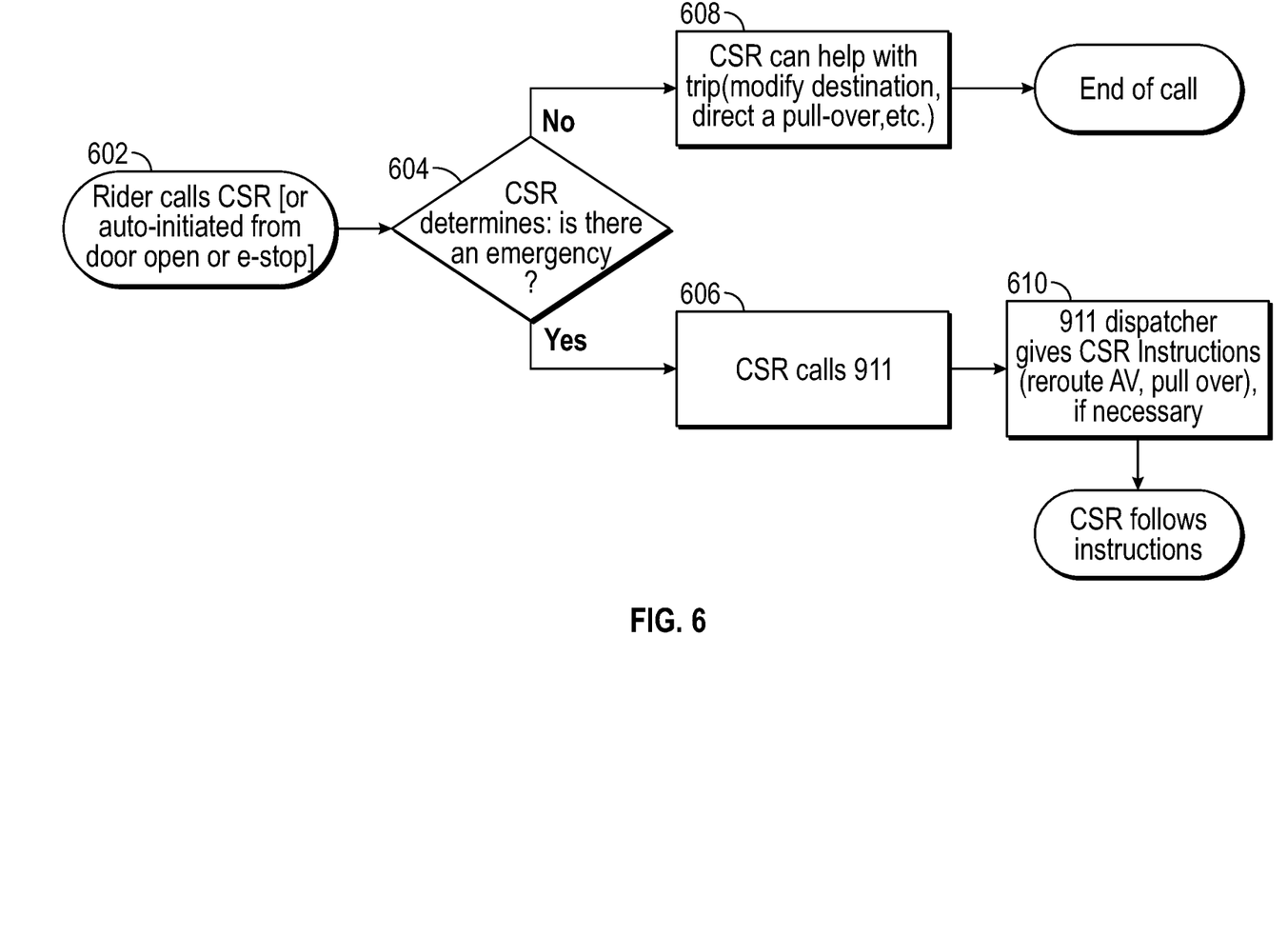
FIG. 6 is a flowchart of an example method related to a customer service system related intervention in autonomous vehicle operation.

FIG. 6 is a flowchart of an example method of the present disclosure that relates to a customer service call sequence. As noted in the examples above, the customer service call sequence generally includes the establishment of a communications channel between an AV and a customer service system, or a communications channel between a mobile device of a passenger in an AV and a customer service system. In some embodiments, the method includes a step 602 of the passenger placing a call to the customer service system. Again, this process can include an automated step performed by the AV based on an indication of an emergency event or a door opening event. In step 604, a customer service representative (CSR) can determine if an emergency exists. If no emergency exists, the method includes the CSR providing trip assistance such as modifying a destination or providing assistance in pulling over the AV at step 608. For example, a pull over request is initially received by a customer service agent and is forwarded to the automated driving system of the AV over a network connection. In one example, the passenger can select to pull over an AV using an application on his/her mobile device. This application directs a pull over request to a customer service agent, and the customer service system can issue commands to the AV to pull over.

Alternatively, if an emergency situation exists, the CSR can call emergency services such as 911 in step 606. In the event that emergency services instructs the CSR to perform an action, such as rerouting the AV to a hospital or having the AV pull over, the CSR can use the customer service system to update a route of the automated driving system of the AV to pull the AV over or redirect it to a nearest hospital in step 610.

EXAMPLES

In some instances, the following examples may be implemented together or separately by the systems and methods described herein.

Example 1 may include a method, comprising: receiving, by an automated driving system of an autonomous vehicle, a pull over request during a trip to a destination; initiating, by the automated driving system, a pull over sequence, the pull over sequence comprising: determining if the autonomous vehicle is within a pre-determined distance from the destination; stopping the autonomous vehicle when the autonomous vehicle is within the pre-determined distance; and when the autonomous vehicle is not within the pre-determined distance, initiating a parking sequence to park the autonomous vehicle at a nearest available parking location.

Example 2 may include the method according to example 1, further comprising initiating any of a holding sequence or an on-boarding sequence when the autonomous vehicle is parked.

Example 3 may include the method according to example 1 and/or some other example herein, further comprising: receiving a ride termination request through a human machine interface after the autonomous vehicle is parked; and initiating an off-boarding sequence upon receiving the ride termination request.

Example 4 may include the method according to example 1 and/or some other example herein, wherein the pull over request is received through a human machine interface associated with the autonomous vehicle.

Example 5 may include the method according to example 1 and/or some other example herein, wherein the pull over request is initially received by a customer service agent and is forwarded to the automated driving system of the autonomous vehicle over a network connection.

Example 6 may include the method according to example 1 and/or some other example herein, further comprising: presenting a message on a human machine interface of the autonomous vehicle that queries a passenger to resume the trip; receiving a response to the message through the human machine interface; and wherein when the response indicates that the passenger does not want to continue the trip, the method further comprises initiating an off-boarding sequence, wherein when the response indicates that the passenger does want to continue the trip, the method further comprises initiating an on-boarding sequence.

Example 7 may include the method according to example 6 and/or some other example herein, further comprising: receiving a hold request through the human machine interface of the autonomous vehicle; and delaying the off-boarding sequence or the on-boarding sequence for a period of time based on the hold request.

Example 8 may include the method according to example 1 and/or some other example herein, wherein when the nearest available parking location is not available, the method further comprises: bringing the autonomous vehicle to a stop in a current lane when the pull over request is indicated as an emergency event; and establishing a communication channel with a customer service agent through a human machine interface of the autonomous vehicle.

Example 9 may include a method, comprising: determining opening of a door of an autonomous vehicle while the autonomous vehicle is in motion during a trip based on signals generated by a door switch of the autonomous vehicle; determining if a speed of the autonomous vehicle is at or below a speed threshold: bringing the autonomous vehicle to a controlled stop in place when the speed of the autonomous vehicle is at or below the speed threshold; or decelerating the autonomous vehicle when the speed of the autonomous vehicle is above the speed threshold and navigating the autonomous vehicle to a nearest available parking location; presenting a message on a human machine interface of the autonomous vehicle that queries a passenger to resume the trip; receiving a response to the message through the human machine interface; and wherein when the response indicates that the passenger does not want to continue the trip, the method further comprises initiating an off-boarding sequence.

Example 10 may include the method according to example 9, wherein when the nearest available parking location is not available, the method further comprises bringing the autonomous vehicle to a controlled stop in place.

Example 11 may include the method according to example 9 and/or some other example herein, wherein if a door associated with the door switch utilizes a hinge, the method further comprises automatically bringing the autonomous vehicle to a controlled stop in place without regard to the speed of the autonomous vehicle.

Example 12 may include the method according to example 9 and/or some other example herein, wherein when the response indicates that the passenger does want to continue the trip, the method further comprises initiating an on-boarding sequence.

Example 13 may include the method according to example 9 and/or some other example herein, further comprising establishing a communication channel with a customer service agent through a human machine interface of the autonomous vehicle.

Example 14 may include an autonomous vehicle, comprising: an automated driving system configured to: autonomously navigate the autonomous vehicle to a destination during a trip; and receive a pull over request during the trip, in response to the pull over request: determine if the autonomous vehicle is within a pre-determined distance from the destination; bring the autonomous vehicle to a controlled stop when the autonomous vehicle is within the pre-determined distance; or initiate a parking sequence to park the autonomous vehicle at a nearest available parking location when the autonomous vehicle is not within the pre-determined distance.

Example 15 may include the autonomous vehicle according to example 14, further comprising a human machine interface that is configured to receive the pull over request during the trip to the destination;

Example 16 may include the autonomous vehicle according to example 15 and/or some other example herein, wherein the human machine interface is configured to: display a first graphical user interface that allows a passenger to choose the pull over request; display a second graphical user interface that allows a passenger to establish a communication channel with a customer service agent; or display a third graphical user interface that allows a passenger to resume or discontinue the trip after the autonomous vehicle has reached the controlled stop or has stopped at the nearest available parking location.

Example 17 may include the autonomous vehicle according to example 15 and/or some other example herein, wherein the automated driving system is further configured to: receive a ride termination request that discontinues the trip, through the human machine interface after the autonomous vehicle is parked; and initiate an off-boarding sequence upon receiving the ride termination request.

Example 18 may include the autonomous vehicle according to example 14 and/or some other example herein, wherein the autonomous vehicle comprises one or more door switches associated with doors of the autonomous vehicle, wherein the automated driving system determines that one of the doors has been opened while the autonomous vehicle is in motion using signals generated by at least one of the one or more door switches.

Example 19 may include the autonomous vehicle according to example 18 and/or some other example herein, wherein when one of the doors that is opened utilizes a hinge, the automated driving system is further configured to bring the autonomous vehicle to a controlled stop irrespective of a speed of the autonomous vehicle or whether the autonomous vehicle is within a pre-determined distance from the destination.

Example 20 may include the autonomous vehicle according to example 14 and/or some other example herein, wherein when the nearest available parking location is not available, the automated driving system is further configured to bring the autonomous vehicle to a controlled stop in place. In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
    receiving, by an automated driving system of an autonomous vehicle, a pull over request during a trip to a destination; and
    initiating, by the automated driving system, a pull over sequence, the pull over sequence comprising:
        determining if the autonomous vehicle is within a pre-determined distance from the destination;
        stopping the autonomous vehicle when the autonomous vehicle is within the pre-determined distance; and
        when the autonomous vehicle is not within the pre-determined distance, initiating a parking sequence to park the autonomous vehicle at a nearest available parking location,
    wherein responsive to determining that a first door of the autonomous vehicle is open while the autonomous vehicle is in motion, and the first door utilizes a slider, the method further comprises:
        bringing the autonomous vehicle to a controlled stop in place responsive to automatically determining that a speed of the autonomous vehicle is at or below the speed threshold; and
        decelerating the autonomous vehicle responsive to automatically determining that the speed of the autonomous vehicle is above the speed threshold and navigating the autonomous vehicle to the nearest available parking location,
    wherein responsive to determining that a second door of the autonomous vehicle is opened while the autonomous vehicle is in motion, and the second door utilizes a hinge, the method further comprises bringing the autonomous vehicle to the controlled stop irrespective of the speed of the autonomous vehicle or whether the autonomous vehicle is within the pre-determined distance from the destination.

2. The method according to claim 1, further comprising initiating any of a holding sequence or an on-boarding sequence when the autonomous vehicle is parked.

3. The method according to claim 1, further comprising:
    receiving a ride termination request through a human machine interface after the autonomous vehicle is parked; and
    initiating an off-boarding sequence upon receiving the ride termination request.

4. The method according to claim 1, wherein the pull over request is received through a human machine interface associated with the autonomous vehicle.

5. The method according to claim 1, wherein the pull over request is initially received by a customer service agent and is forwarded to the automated driving system of the autonomous vehicle over a network connection.

6. The method according to claim 1, further comprising:
    presenting a message on a human machine interface of the autonomous vehicle that queries a passenger to resume the trip;
    receiving a response to the message through the human machine interface; and
    wherein when the response indicates that the passenger does not want to continue the trip, the method further comprises initiating an off-boarding sequence, wherein when the response indicates that the passenger does want to continue the trip, the method further comprises initiating an on-boarding sequence.

7. The method according to claim 6, further comprising:
    receiving a hold request through the human machine interface of the autonomous vehicle; and
    delaying the off-boarding sequence or the on-boarding sequence for a period of time based on the hold request.

8. The method of claim 1, wherein when the nearest available parking location is not available, the method further comprises:
    bringing the autonomous vehicle to a stop in a current lane when the pull over request is indicated as an emergency event;
    establishing, based on the pull over request, a communication channel with a customer service agent through a human machine interface of the autonomous vehicle;
    receiving, from the customer service agent via a network connection, a signal indicating that the emergency event has been resolved; and
    automatically, based on the signal, causing the autonomous vehicle to continue the trip.

9. The method of claim 1, wherein determining that the first door of the autonomous vehicle is opened while the autonomous vehicle is in motion comprises determining a first contact of a door switch associated with the first door moves away from a second contact of the door switch, wherein the first contact is inserted into the first door, and the second contact is integrated into a frame of the autonomous vehicle that the first door mates with when closed.

10. A method, comprising:
    determining opening of a door of an autonomous vehicle while the autonomous vehicle is in motion during a trip based on signals generated by a door switch of the autonomous vehicle;
    responsive to determining that the door associated with the door switch utilizes a hinge, automatically bringing the autonomous vehicle to a controlled stop in place without regard to a speed of the autonomous vehicle;

responsive to determining that the door associated with the door switch utilizes a slider:
  bringing the autonomous vehicle to the controlled stop in place when responsive to automatically determining that the speed of the autonomous vehicle is at or below the speed threshold; and
  decelerating the autonomous vehicle when responsive to automatically determining that the speed of the autonomous vehicle is above the speed threshold and navigating the autonomous vehicle to a nearest available parking location;
presenting a message on a human machine interface of the autonomous vehicle that queries a passenger to resume the trip;
receiving a response to the message through the human machine interface; and
wherein when the response indicates that the passenger does not want to continue the trip, the method further comprises initiating an off-boarding sequence.

11. The method according to claim 10, wherein when the response indicates that the passenger does want to continue the trip, the method further comprises initiating an on-boarding sequence.

12. The method of claim 10, wherein when the nearest available parking location is not available, the automated driving system is further configured to:
  bring the autonomous vehicle to a stop in a current lane when a pull over request is indicated as an emergency event;
  automatically establish, based on the pull over request, a communication channel with a customer service agent through a human machine interface of the autonomous vehicle;
  receive, from the customer service agent via a network connection, a signal indicating that the emergency event has been resolved; and
  automatically, based on the signal, cause the autonomous vehicle to continue the trip.

13. The method of claim 10, wherein determining opening of the door of the autonomous vehicle while the autonomous vehicle is in motion comprises determining a first contact of the door switch associated with the door moves away from a second contact of the door switch, wherein the first contact is inserted into the door, and the second contact is integrated into a frame of the autonomous vehicle that the door mates with when closed.

14. An autonomous vehicle, comprising:
an automated driving system configured to:
  autonomously navigate the autonomous vehicle to a destination during a trip; and
  receive a pull over request during the trip, in response to the pull over request:
  determine if the autonomous vehicle is within a pre-determined distance from the destination;
    bring the autonomous vehicle to a controlled stop when the autonomous vehicle is within the pre-determined distance; or
    initiate a parking sequence to park the autonomous vehicle at a nearest available parking location when the autonomous vehicle is not within the pre-determined distance;
  wherein responsive to determining that a first door of the autonomous vehicle is open while the autonomous vehicle is in motion, and the first door utilizes a slider, the automated driving system is further configured to:
    bring the autonomous vehicle to a controlled stop in place responsive to automatically determining that the speed of the autonomous vehicle is at or below the speed threshold; and
    decelerate the autonomous vehicle responsive to automatically determining that the speed of the autonomous vehicle is above the speed threshold and navigating the autonomous vehicle to the nearest available parking location;
  wherein responsive to determining that a second door of the autonomous vehicle is opened while the autonomous vehicle is in motion, and the second door utilizes a hinge, the automated driving system is further configured to bring the autonomous vehicle to the controlled stop irrespective of the speed of the autonomous vehicle or whether the autonomous vehicle is within the pre-determined distance from the destination.

15. The autonomous vehicle according to claim 14, further comprising a human machine interface that is configured to receive the pull over request during the trip to the destination.

16. The autonomous vehicle according to claim 15, wherein the human machine interface is configured to:
  display a first graphical user interface that allows a passenger to choose the pull over request;
  display a second graphical user interface that allows the passenger to establish a communication channel with a customer service agent; or
  display a third graphical user interface that allows the passenger to resume or discontinue the trip after the autonomous vehicle has reached the controlled stop or has stopped at the nearest available parking location.

17. The autonomous vehicle according to claim 15, wherein the automated driving system is further configured to:
  receive a ride termination request that discontinues the trip, through the human machine interface after the autonomous vehicle is parked; and
  initiate an off-boarding sequence upon receiving the ride termination request.

18. The autonomous vehicle according to claim 14, wherein the autonomous vehicle comprises one or more door switches associated with the first door of the autonomous vehicle, wherein the automated driving system determines that the first door has been opened while the autonomous vehicle is in motion using signals generated by at least one of the one or more door switches.

19. The autonomous vehicle of claim 14, wherein when the nearest available parking location is not available, the automated driving system is further configured to:
  bring the autonomous vehicle to a stop in a current lane when the pull over request is indicated as an emergency event;
  automatically establish, based on the pull over request, a communication channel with a customer service agent through a human machine interface of the autonomous vehicle;
  receive, from the customer service agent via a network connection, a signal indicating that the emergency event has been resolved; and
  automatically, based on the signal, cause the autonomous vehicle to continue the trip.

20. The autonomous vehicle of claim 18, wherein determining that the first door of the autonomous vehicle has been opened while the autonomous vehicle is in motion comprises determining a first contact of the one or more door switches associated with the first door moves away from a second contact of the one or more door switches, wherein the first contact is inserted into the first door, and the second contact is integrated into a frame of the autonomous vehicle that the first door mates with when closed.

\* \* \* \* \*